L. DRAGON.
SAW.
APPLICATION FILED AUG. 2, 1920.
1,392,050.
Patented Sept. 27, 1921.
2 SHEETS—SHEET 1.
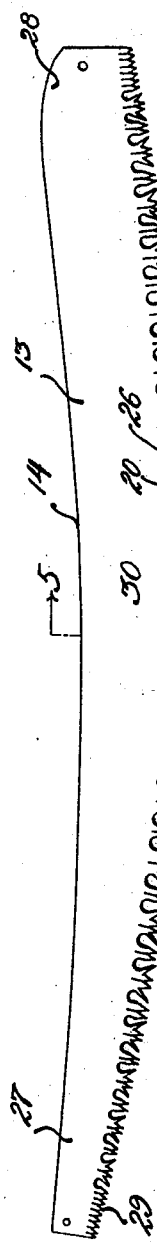
Witnesses
Geo. A. Gruss
Augustus B. Coppes
Inventor
Louis Dragon
By Joshua R. H. Potts
his Attorney

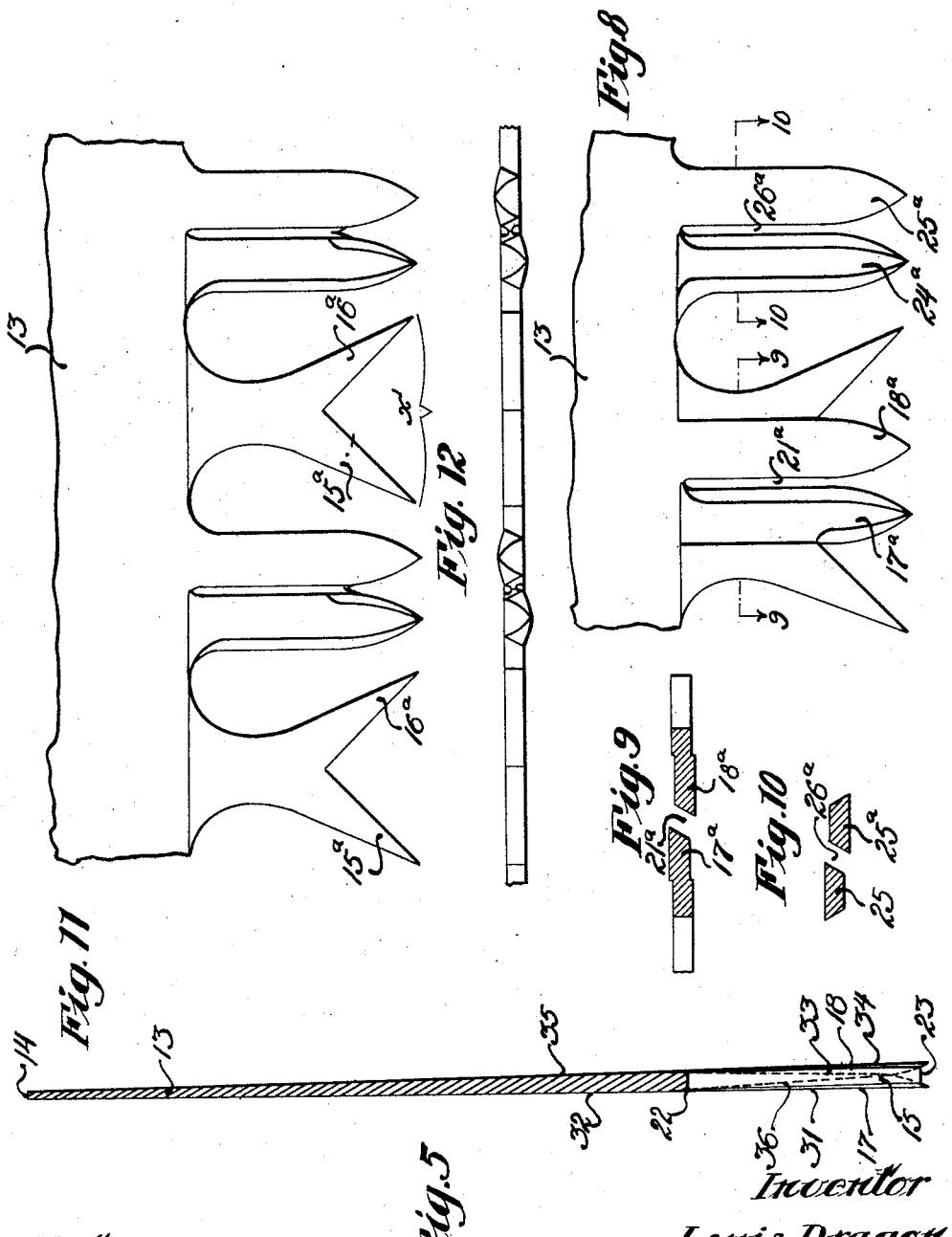

UNITED STATES PATENT OFFICE.

LOUIS DRAGON, OF PHILADELPHIA, PENNSYLVANIA, ASSIGNOR OF ONE-THIRD TO SAM REH AND ONE-THIRD TO JOSEPH REIBLE, BOTH OF PHILADELPHIA, PENNSYLVANIA.

SAW.

1,392,050.  Specification of Letters Patent.  Patented Sept. 27, 1921.

Application filed August 2, 1920. Serial No. 400,776.

*To all whom it may concern:*

Be it known that I, LOUIS DRAGON, a subject of the Dominion of Canada, residing at Philadelphia, in the county of Philadelphia and State of Pennsylvania, have invented certain new and useful Improvements in Saws, of which the following is a specification.

One object of my invention is to provide an improved saw which will be so constructed that it will cut faster and more easily than saws which were made prior to my invention.

Another object is to so arrange and shape the body and cutting portions of my improved saw that labor and material will be saved in their manufacture.

A further object is to so construct my improved saw that it can be readily sharpened and will last longer than saws of like character made prior to my invention.

These objects, and other advantageous ends which will be described hereinafter, I attain in the following manner, reference being had to the accompanying drawings in which—

Figure 1 is an elevation of a two man cross cut saw made in accordance with my invention, Fig. 2 is a fragmentary elevation of certain of the parts shown in Fig. 1 and drawn on an enlarged scale so as to more clearly illustrate the details of the cutting parts, Fig. 3 is a bottom plan view of Fig. 2 showing the cutting parts and the permanent setting of certain of said parts, Fig. 4 is an end view of Fig. 2, Fig. 5 is an enlarged section taken on the line 5—5 of Fig. 1, Fig. 6 is a fragmentary sectional plan view taken on the line 6—6 of Fig. 2, Fig. 7 is a fragmentary plan view taken on the line 7—7 of Fig. 2, Fig. 8 is a view of the same general character to that shown in Fig. 2 and showing a slight modification in the formation of certain of the cutting parts, Fig. 9 is a fragmentary section taken on the line 9—9 of Fig. 8, Fig. 10 is a fragmentary section taken on the line 10—10 of Fig. 8, Fig. 11 is a fragmentary elevation showing a modified form of certain of the parts, and Fig. 12 is a bottom plan view of Fig. 11.

Referring to the drawings and particularly to Figs. 1 to 7 inclusive, my improved saw includes a body or blade portion 13 which is of the shape shown in Fig. 1; said blade portion flaring downwardly from its upper edge 14 as shown in the cross section illustrated in Fig. 5. The lower edge portion of the blade 13 is provided with cutting elements of various characters which alternate with each other within the central portion of the saw as clearly shown in Figs. 1 and 2; said cutting elements being arranged in groups as indicated at *x* and *y*.

The groups *x* alternate with the groups *y* and each group *x* includes two cutting parts 15 and 16 which will hereinafter be termed "chisels." Between these chisels 15 and 16 are located the cutting knives 17 and 18; the knife 17 being located adjacent the chisel 15 and the knife 18 being located adjacent the chisel 16. These knives 17 and 18 are similarly constructed with exception that they are set in opposite directions as clearly shown in Fig. 3 and have their opposite faces beveled or sharpened as shown at 19; the sharpening occurring on the knife 17 at one surface and on the knife 18 on the opposite surface. In other words one knife is sharpened on one surface and the other knife of each group is sharpened on the opposite surface as clearly shown in full and dotted lines in Fig. 2.

The metal is cut away on opposite sides of the blade to form grooves 20; said grooves leading upwardly between the knives 17 and 18 to reduce the thickness of metal and at the same time to permit a thin web of metal, as shown at 21 in Fig. 7, to connect the knives 17 and 18 together practically throughout their entire heights or depths. This construction also permits the more ready sharpening of the knives at points therebetween. The opposite sides of the chisels 15 and 16 are preferably made parallel below the line 22 and the blade 13 above the line 22 tapers toward the edge 14 as clearly shown in Fig. 5. The bottom edges 23 of the chisels 15 and 16 extend straight across in the same manner as an ordinary chisel and these chisels 15 and 16 slant in opposite directions.

By the construction above set forth it will be noted that the lower cutting portions of the knives 17 and 18 cut a path of greater width than the width of the chisels 15 and 16 and the cutting edges 23 of the chisels are preferably made slightly shorter or in other words are located above the level of the lowermost parts of the knives 17 and 18. In the form of my invention, as illustrated, between each group $x$ is located a group $y$ of teeth; there being in the present instance two teeth 24 and 25 in each group $y$. These teeth 24 and 25 are constructed similarly to the teeth or knives 17 and 18 above described and include a portion 26 of reduced thickness which is in the form of a groove similar to the groove 20 described in connection with the group $x$ and serves for the same purpose. The parts above described are of greater depth at the central portion of the blade than they are adjacent the opposite end portions 27 and 28 of the blade; the depth of the teeth of said cutting parts becoming gradually less as they approach the opposite end portions 27 and 28 as clearly shown in Fig. 1. Directly adjacent the extreme ends of the blade are provided groups of closely positioned teeth 29 and 30 as is usually the custom to provide in saws of this character and it will be noted that by producing a blade of the shape illustrated in Fig. 1 that an extremely advantageous bulged or belly portion 30 is provided adjacent the central or middle portion of the saw between the end portions 27 and 28; said central portion taking the greatest amount of wear during the action of the saw.

In the form of my invention shown in Figs. 8 to 10 inclusive the structure is similar to that above described in connection with Figs. 1 to 7 with exception that instead of permitting a small portion of the metal to remain between the knives of the groups $x$ and the teeth of the groups $y$, as shown at 21 and 26, in Figs. 6 and 7, the entire metal between the knives 17$^a$ and 18$^a$ is cut away as shown at 21$^a$ and the entire metal between the teeth 24$^a$ and 25$^a$ is cut away as shown at 26$^a$. In each instance the knives and teeth preferably have one surface in the plane of the side of the blade, while the opposite surface is tapered. For example as shown in Fig. 5, the surface 31 of one knife is in the same plane with the side surface 32 of the blade and the opposite surface 33 is beveled as shown in dotted lines so that the knife tapers downwardly. The adjacent knife alternates with this construction. In other words the surface 34 is in the same plane with the surface 35 of the blade and the opposite surface 36 of the knife is tapered or beveled downwardly as shown in dotted lines.

In the form of the invention shown in Figs. 11 and 12 the knives or teeth are omitted between the groups $x^1$ of the chisels 15$^a$ and 16$^a$. In all other respects the construction is similar to that described in connection with Figs. 1 to 7. While the form shown in Figs. 11 and 12 does not present the same amount of cutting portions nevertheless the principle of the disposition, arrangement and construction of the chisels and knives or teeth is similar to that described in the previously mentioned description.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A saw including a blade having opposite faces inclined in opposite directions to a plane extending centrally through the thickness thereof, said blade having knives, in which adjacent knives have opposite surfaces coincident respectively with the opposite surfaces of said blade, said blade having chisel teeth adjacent said knives, said chisel teeth having opposite side surfaces extending substantially parallel to each other; substantially as described.

2. A saw blade flaring in cross section to its cutting edge portion and having opposite faces inclined in opposite directions to a plane passing centrally through the thickness thereof, said cutting edge portion including knives spaced apart in the direction of the length of the blade, certain of said knives having outer side surfaces in the plane of one of said inclined surfaces of the blade and an opposite surface slanting at an incline to said first plane from that which said first surface thereof slants, said second mentioned surface of said latter knives being beveled in opposite direction from said first surface thereof to provide the sharpened edges for said knives coincident with said first surfaces thereof, others of said knives having side surfaces in the plane of the opposite surface of said blade, the other side surfaces of said latter mentioned knives being at an incline to said second plane and extending in an opposite direction to that which said first mentioned surface of the latter mentioned blades are inclined, said cutting edge portion of the blade including intervening chisel teeth; substantially as described.

3. A saw blade flaring in cross section to its cutting edge portion and having opposite faces inclined in opposite directions to a plane passing centrally through the thickness thereof, said cutting edge portion including knives spaced apart in the direction of the length of the blade, certaitn of said knives having outer side surfaces in the plane of one of said inclined surfaces of the blade and an opposite surface slanting at an incline to said first plane from that which said first surface thereof slants, said second mentioned surface of said latter knives being beveled in opposite directions from said first surface thereof to provide the sharpened edges for said knives coincident with said first surfaces thereof, others of said knives having side surfaces in the plane of the opposite surface of said blade, the other side surfaces of said latter mentioned knives being at an incline to said second plane and extending in an opposite direction to that which said first mentioned surface of the latter mentioned blades are inclined, said cutting edge portion of the blade including intervening chisel teeth with substantially parallel opposite side surfaces; substantially as described.

In testimony whereof I have signed my name to this specification in the presence of two subscribing witnesses.

LOUIS DRAGON.

Witnesses:
  SAM REH,
  CHAS. E. POTTS.